(12) United States Patent
Hirano et al.

(10) Patent No.: US 7,479,319 B2
(45) Date of Patent: Jan. 20, 2009

(54) GLASS SUBSTRATE AND GLASS CUTTING METHOD

(75) Inventors: Tomio Hirano, Miyagi (JP); Nobuyuki Oikawa, Miyagi (JP); Makio Onodera, Miyagi (JP); Masao Ono, Miyagi (JP); Hideki Sato, Miyagi (JP); Yukihiro Onodera, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/621,714

(22) Filed: Jul. 18, 2003

(65) Prior Publication Data

US 2004/0086688 A1    May 6, 2004

(30) Foreign Application Priority Data

Jul. 24, 2002    (JP) .............................. 2002-215760

(51) Int. Cl.
    *B32B 1/00* (2006.01)
(52) U.S. Cl. ....................... 428/141; 428/156; 428/157; 219/121.6; 345/173
(58) Field of Classification Search ................ 428/141, 428/156, 167, 157; 225/2, 96; 219/121.6–121.86; 345/173
See application file for complete search history.

(56) References Cited

U.S. PATENT DOCUMENTS

| 4,781,792 | A | * | 11/1988 | Hogan | ........................ 216/36 |
| 4,987,287 | A | * | 1/1991 | Jack | ....................... 219/121.69 |
| 5,314,731 | A | * | 5/1994 | Yoneda et al. | ............... 428/429 |
| 5,826,772 | A | * | 10/1998 | Ariglio et al. | ................... 225/2 |
| 5,919,607 | A | * | 7/1999 | Lawandy | ..................... 430/326 |
| 6,287,996 | B1 | * | 9/2001 | Chiba et al. | .................... 501/17 |
| 6,327,875 | B1 | * | 12/2001 | Allaire et al. | .................. 65/103 |

FOREIGN PATENT DOCUMENTS

| JP | 10-207630 | 8/1998 |
| JP | 11-191341 | 7/1999 |
| JP | 2000-247671 | 9/2000 |
| JP | 2001-58281 | 3/2001 |
| JP | 2002-47025 | 2/2002 |
| JP | 2002-82772 | 3/2002 |

* cited by examiner

*Primary Examiner*—Alicia Chevalier
(74) *Attorney, Agent, or Firm*—Oblon, Spivak, McClelland, Maier & Neustadt, P.C.

(57) ABSTRACT

A glass substrate excellent in strength properties and a glass cutting method are provided. When a glass substrate having predetermined size is to be formed by cutting a glass plate, any crack or chip is not generated on a cut face. Therefore, a pulverized powder is prevented from being generated from this portion. A glass substrate is obtained by cutting at least with laser light radiation so that a surface roughness of cut side faces and of the glass substrate are 50 nm or less and a depth of laser marks and on the cut side faces are 0.06 mm or more.

7 Claims, 8 Drawing Sheets

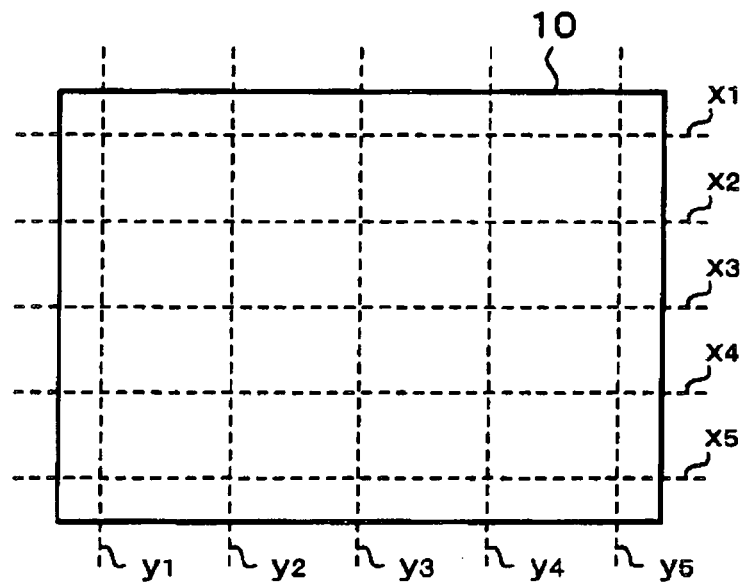
FIG.3A
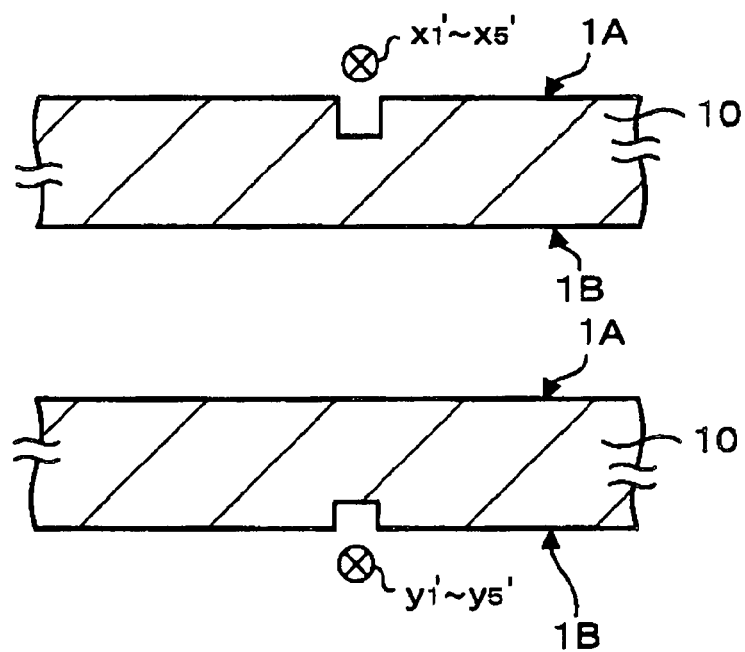
FIG.3B
FIG.3C

GLASS SUBSTRATE AND GLASS CUTTING METHOD

CROSS REFERENCE TO RELATED APPLICATIONS

The present document is based on Japanese Priority Document JP2002-215760, filed in the Japanese Patent Office on Jul. 24, 2002, the entire contents of which being incorporated herein by reference.

BACKGROUND OF THE INVENTION

1. Field of the Invention

The present invention relates to a glass substrate that is formed by cutting glass with laser light radiation and forced cooling, and to a glass cutting method.

2. Description of Related Art

In general, as a glass cutting method for cutting a glass plate vertically and horizontally to produce a glass substrate with predetermined width and length, there is a mechanical cutting method as described in, for example, Japanese Patent Publication No. 11-71124, or a laser cutting method for using laser light radiation is employed.

In the case where a cutting method with a mechanical process is employed, a blade pressurizes glass to generate median cracks, that is, cracks propagating vertically onto a glass surface, thereby cutting the glass. In this cutting method, the thus formed glass cut faces are brought into contact with each other in a depressurization step of the blade, resulting-in generation of lateral cracks, that is, cracks propagating horizontally on a glass surface.

Therefore, it was conventionally difficult to perfectly prevent the generation of microcracks, that is, lateral cracks generated on a cut face in a mechanical glass cutting process. The generation of cracks also leads to generation of a pulverized powder, so-called cullet. As a result, inconveniences occur in that, for example, the cullet covers the surface of a display and impairs the visibility. Moreover, in the case where a glass substrate is used for a touch panel or the like, the cullet adheres to a transparent conductive layer and causes short circuit.

Although there is a method for reducing the generation of such lateral cracks through a chemical treatment, such a method wanes the productivity, leading to increased cost. Moreover, the use of a chemical treatment has a problem in that it generates a variation in glass strength.

On the other hand, as a laser cutting method, for example, a heat cutting method with a carbon dioxide gas laser has been proposed in Japanese Patent Publication No. 8-217478, Japanese Patent Publication No. 11-254172 and the like.

In the case where a cutting method only with normal laser light radiation is used, however, on a cut side face of the glass substrate 1 which is formed by radiating laser light, minute cracks and cullet are adversely generated in a laser mark 2 that appears from the laser-irradiated side, as represented by a schematic sectional structure showing an example thereof in FIG. 8.

To cope with such a problem, a cutting method, which takes advantage of combined effects of heating through radiation of a carbon dioxide gas laser or the like and forced cooling using water or a compressed air, has been proposed. According to this method, a thermal strain is generated in glass owing to the combined effects and is used as a trigger to cut a glass to be separated.

In particular, this cutting method incorporating laser radiation and forced cooling attracts attention as a cutting method for obtaining a thin glass substrate having a thickness of 1.1 mm or less, for example, about 0.3 to 0.7 mm. Such a thin glass substrate is utilized for a touch panel that is recently attached on a surface of various displays as a simple way of inputting information or for a portable terminal using such a touch panel.

This method is advantageous in that microcracks are scarcely generated because no mechanical force is applied to a glass.

SUMMARY OF THE INVENTION

Even in the case where such laser light radiation and forced cooling are conducted, however, as schematically illustrated in FIG. 9A, if laser light is radiated on a glass plate 10, for example, in a horizontal direction indicated with a broken line $x_1$ and longitudinal directions indicated with broken lines $y_1$ and $y_2$, followed by forced cooling so as to cut the glass plate 10, a burr 11 or a chip 12 occurs at an intersection a of horizontal laser radiation and longitudinal laser radiation as shown in FIG. 9B.

At the intersection a, it is desirable that cut faces should be vertical as shown in FIG. 9C. In fact, however, a cut face becomes slant or curved to give rise to degradation of dimensional accuracy. As a result, the productivity and yield decrease, which in turn disadvantageously increases the cost.

The present invention provides a glass substrate excellent in strength properties and a glass cutting method, which prevents the generation of a crack and a chip on cut faces when a glass substrate having predetermined size is separated from a glass plate, thus avoiding the generation of any pulverized powder at the cut portion.

In the present invention, a glass substrate is formed by cutting at least with laser light radiation, wherein a surface roughness is 50 nm or less on a cut side face of the glass substrate and a depth of a laser mark on the cut side face is 0.06 mm or more.

Moreover, in the above-described structure, the depths of the laser marks are different on a first cut side face of the glass substrate and on a second cut side face of the glass substrate. The second cut face is different from the first cut side face.

Furthermore, the above-described depths of the laser marks are different by 2% or more between on the first cut side face and on the second cut side face.

Moreover, in each of the above-described structures, the laser mark is formed on the first cut side face of the glass substrate so as to have a predetermined depth from a first principal surface of the glass substrate, whereas the laser mask is formed on the second cut side face of the glass substrate so as to have a predetermined depth from a second principal surface. The second cut side face is different from the first cut side face and the second principal surface is the back surface of the first principal surface.

Furthermore, in a glass cutting method for cutting a glass plate using at least laser light radiation and forced cooling, cutting is carried out while varying a laser power or a scanning speed of laser light between in a first cutting direction with respect to the glass plate and in a second cutting direction. The second cutting direction is different from the first cutting direction.

Moreover, in the above-described glass cutting method, the laser power or the scanning speed of the laser light is varied by 4% or more between in the first cutting direction and in the second cutting direction.

Furthermore, in a glass cutting method for cutting a glass plate using laser light radiation and forced cooling, including the steps of radiating laser light onto the first principal surface of the glass plate so as to cut the glass plate in the first cutting direction, and radiating laser light radiation onto the second principal surface of the glass plate so as to cut the glass plate in the second cutting direction. The second cutting direction is different from the first cutting direction and the second principal surface is the back surface of the first principal surface.

Furthermore, the glass substrate having the above-described structure is used for a touch panel including a glass substrate, a light-transmitting conductive layer formed on the glass substrate, and a film base material arranged so as to be opposed to the glass substrate at a predetermined distance therebetween.

Furthermore, in the present invention, the glass substrate having the above-described structure is used for a portable terminal with a touch panel.

As described above, in the present invention, in a glass cutting method using laser light radiation and forced cooling, immediately after laser light is radiated at a different laser power or a different scanning speed of the laser light so that depth of the laser mark on the first cut side face of the glass substrate differs from that on the second cut side face, forced cooling is performed so as to cut the glass. In this manner, the generation of any crack or burr can be prevented at an intersection between the first cut side face and the second cut side face. As a result, the glass substrate can be obtained by cutting at predetermined dimensional accuracy.

Furthermore, the glass substrate is cut in the first cutting direction and in the second cutting direction by radiating laser light from different principal surfaces (the front surface and the back surface) of the glass substrate, respectively, so that laser marks are vertically separated on the different cut side faces. As a result, the generation of any crack or burr can be prevented at the intersection between the first and the second cut side faces in the same manner as above. Therefore, the glass substrate can be obtained by cutting at predetermined dimensional accuracy.

The reason for success in such cutting is understood to be as follows. A stress of a strain, which might be otherwise generated by heating with laser light radiation followed by forced cooling, can be prevented from being generated in two directions at the intersection of the cut side faces. A stress is generated only in a direction vertical to glass cutting, that is, only in a direction vertical to a principal surface of the glass substrate so as to cut the glass plate.

According to such a glass cutting method of the present invention, a surface roughness of the cut side face is 50 nm or less, so that a glass substrate which does not require any chemical treatment on its side faces can be obtained. Moreover, the glass substrate can maintain a strength of 45 kgf or more based on a static load measurement.

Furthermore, according to the present invention, since any crack or burr is not generated, a thin glass substrate at predetermined dimensional accuracy can be manufactured with good productivity and yield. Therefore, in the case where the glass substrate according to the present invention is used for a touch panel or a portable terminal, the improvement in productivity and yield as well as the reduction in cost can be ensured.

As described above, in a glass cutting method, laser marks have different depths on the cut side faces of a glass substrate after cutting. Moreover, the laser marks are formed from the first principal surface and the second principal surface of the glass substrate. As a result, the generation of a burr or a chip on the cut side face of glass can be avoided, so that the glass substrate, on which no pulverized powder is adhered, can be manufactured at predetermined dimensional accuracy with good yield and productivity.

According to the present invention as described above, any crack is prevented from being generated on the cut side faces. Glass breakage and glass chip, which might otherwise occur due to the generation of a crack, are reduced and remarkably decreased, respectively. As a result, a glass substrate for a touch panel, excellent in properties, can be provided.

Moreover, the static load strength of glass can be improved to about 45 kgf or more, which is higher than a conventional strength. Therefore, for a touch panel using this glass substrate, the strength of a product can be improved.

In particular, the strength against a pressure to a touch panel at the time of inputting information, which is peculiar to a touch panel, or the strength against a load or an impulse applied by an accidental force in the daily life, can be improved. As a result, product failure and complaints from consumers can be reduced.

Therefore, according to the present invention, the improvement in reliability, durability and quality of a product itself such as a touch panel or a portable terminal can be achieved. Furthermore, the glass substrate can be further thinned, whereby a touch panel and a portable terminal can be thinner and lighter, size and weight.

Furthermore, in the case where a product is not intended to be miniaturized, the functionality of the product can be enhanced by adding functions owing to saving space which is realized by reducing a thickness of the substrate. Moreover, the improvement in assembly accuracy of products and the reduction in variation of product quality can be realized.

BRIEF DESCRIPTION OF THE DRAWINGS

The above and other objects, features and advantages of the present invention will become more apparent from the following description of the presently preferred exemplary embodiments of the present invention taken in conjunction with the accompanying drawings, in which:

FIG. 3A is an illustration of an example of a glass cutting method, FIG. 3B is an illustration of an example of the glass cutting method, and FIG. 3C is an illustration of an example of the glass cutting method;

DESCRIPTION OF THE PREFERRED EMBODIMENTS

Hereinafter, embodiments of a glass substrate and a glass cutting method according to the present invention and examples and comparative examples based on the embodiments will be described in detail with reference to the accompanying drawings. In the following embodiments, the case where the present invention is applied to a glass substrate for a portable terminal equipped with a touch panel and to a cutting method for obtaining such a glass substrate will be described. However, it is apparent that various changes and modifications are possible unless the invention departs from the scope of the present invention.

In FIGS. 1A to 1D, a schematic structure of a glass substrate 1 according to a structure of the present invention is shown. As a material of the glass substrate 1, besides so-called soda glass made of Na, K and $SiO_2$, nonalkali glass can also be used.

Figure 1A:
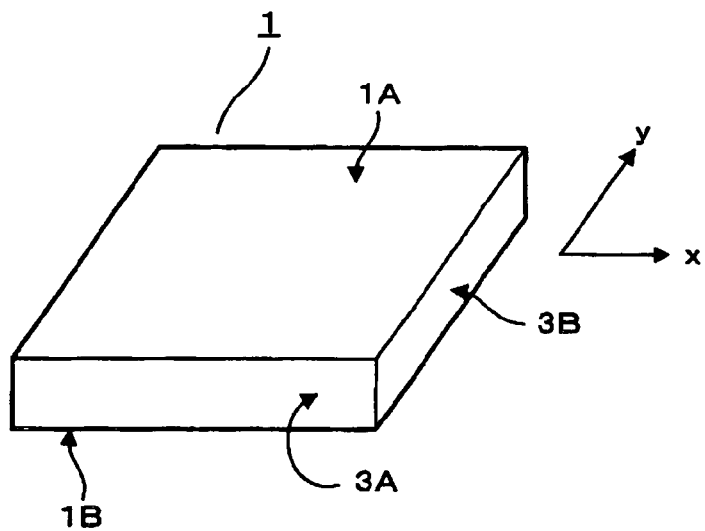
FIG. 1A is a schematic perspective view of an example of a glass substrate.

As shown in FIG. 1A, the glass substrate 1 has a first principal surface 1A and a second principal surface 1B. The glass substrate 1 also has a first side face 3A and a second side face 3B along two perpendicularly crossing directions indicated with, for example, arrows x and y, respectively.

Figure 1B:
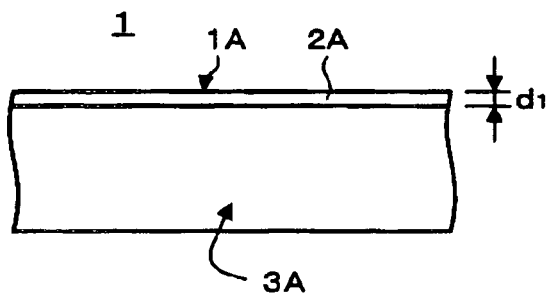
FIG. 1B is a schematic side view of a principal part of an example of the glass substrate.
Figure 1C:
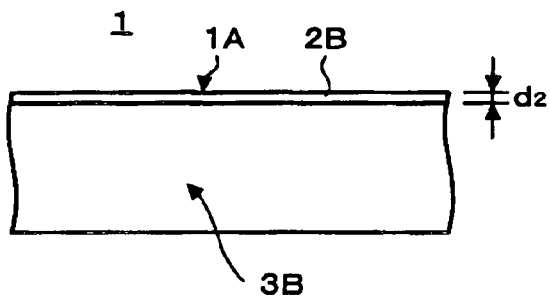
FIG. 1C is a schematic side view of a principal part of an example of the glass substrate.
Figure 1D:
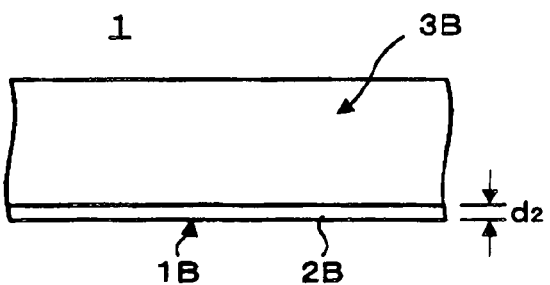
FIG. 1D is a schematic side view of a principal part of an example of the glass substrate.

In the glass substrate according to the present invention, as shown in FIG. 1B, a laser mark 2A having a depth $d_1$ from the first principal surface 1A is formed on the first side face 3A. As shown in FIG. 1C, a laser mark 2B having a depth $d_2$ from the first principal surface 1A is formed on the second side face 3B. The relationship between the above-described depths $d_1$ and $d_2$ is established as $d_1 \neq d_2$.

Another glass substrate according to the present invention is formed so that the laser mark 2A having the depth $d_1$ from the first principal surface 1A is formed on the first side face 3A as shown in FIG. 1B while the laser mark 2B having the depth $d_2$ from the second principal surface 1B is formed on the second side face 3B. In this case, the relationship between the depths $d_1$ and $d_2$ may be either $d_1=d_2$ or $d_1 \neq d_2$.

Next, a glass cutting method for cutting a glass as described above will be described.

Figure 2A:
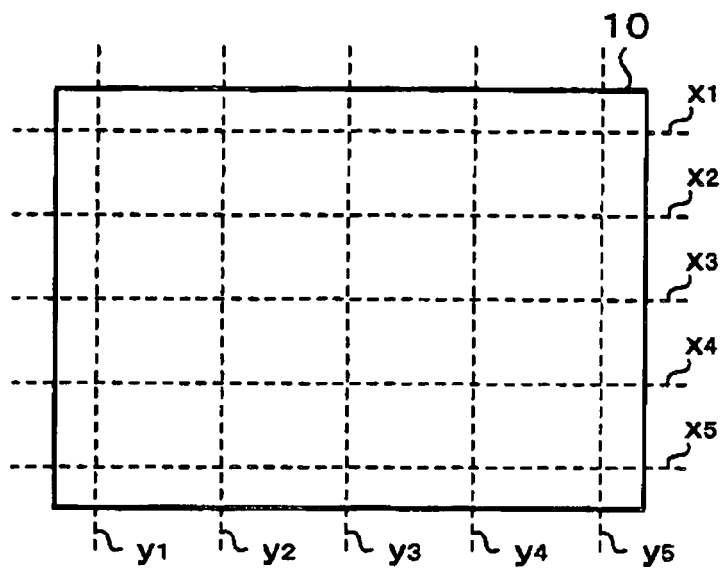
FIG. 2A is an illustration of an example of a glass cutting method.

First, as shown in a schematic plan view of FIG. 2A, a glass plate 10 made of soda glass or the like with a thickness of, for example, 0.7 mm is cut with laser light radiation and forced cooling in a first cutting direction indicated with horizontal broken lines $x_1$ to $x_5$ in FIG. 2A and in a second cutting direction indicated with longitudinal broken lines $y_1$ to $y_5$.

Figure 2B:
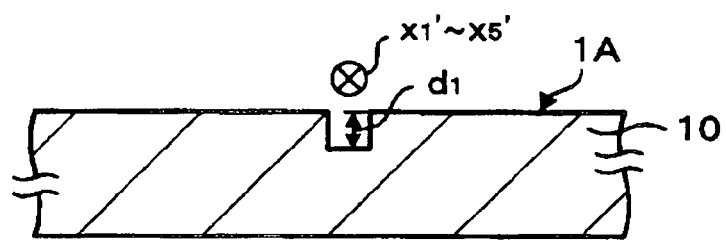
FIG. 2B is an illustration of an example of the glass cutting method.
Figure 2C:
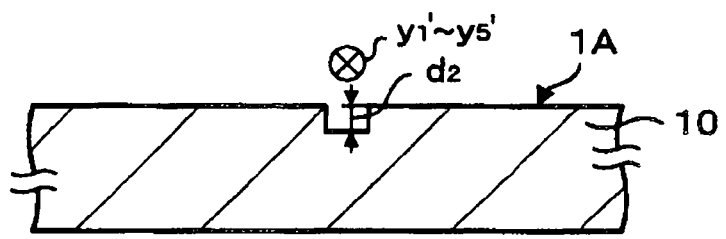
FIG. 2C is an illustration of an example of the glass cutting method.

In the present invention, as in FIGS. 2B and 2C where laser light radiation regions respectively are shown as concave notches on the first principal surface 1A of the glass plate 10, a cut depth of the laser radiation region in the first cutting direction is made different from that in the second cutting direction.

Specifically, as shown in FIG. 2B, for laser light radiation in a vertical direction indicated with arrows $x_1'$ to $x_5'$, a depth in the first cutting direction is set at $d_1$ in the first cutting direction corresponding to the broken lines $x_1$ to $x_5$ in FIG. 2A.

As shown in FIG. 2C, for laser light radiation in a vertical direction indicated with arrows $y_1'$ to $y_5'$, the laser light radiation is conducted so that a depth $d_2$ in the second cutting direction differs from the above-described depth $d_1$ in the second cutting direction corresponding to the broken lines $y_1$ to $y_5$ in FIG. 2A.

As a specific method for making the depths in the respective cutting directions different from each other, a method of varying a laser power or a scanning speed of laser light radiation can be adapted.

Since the definition itself of a quantitative measurement of a processing depth while varying the conditions of laser light radiation is not standardized, the result of such a measurement is not generally represented in numerical terms. For simplification, however, examples and comparative examples described below are carried out, assuming that the energy of laser radiation for each unit area and the laser processing depth are in proportion to each other in this specification.

In another aspect of the present invention, as schematically shown in FIGS. 3A and 3C, laser light radiation is performed from the side of the first principal surface 1A and the side of the second principal surface 1B of the glass plate 10, respectively.

Specifically, for cutting in the first cutting direction indicated with the broken lines $x_1$ to $x_5$ in FIG. 3A, laser light is radiated onto the first principal surface 1A of the glass plate 10 as schematically indicated with arrows $x_1'$ to $x_5'$ in FIG. 3B.

For cutting in the second cutting direction indicated with the broken lines $y_1$ to $y_5$ in FIG. 3A, when scanning radiation of laser light is implemented in a direction vertical to the paper plane of FIG. 3C, laser light is radiated onto the second principal surface 1B of the glass plate 10 as schematically indicated with arrows $y_1'$ to $y_5'$ in FIG. 3C.

In FIGS. 2B, 2C, 3B and 3C described above, a cut portion is schematically illustrated as a concave notch in a laser light radiation region. This cut portion schematically represents a region constituting the laser mark 2 on the cut side face, described in FIGS. 1A to 1D. The laser mark is formed at directly below the principal surface by laser radiation and forced cooling, which corresponds to the concave notch. Below the laser mark, the cut side face perpendicular to the principal surface of the substrate is formed.

In any of the above-described cases, immediately after scanning radiation of laser light, forced cooling is performed by approaching a nozzle for spraying, for example, a volatile material such as ethanol, methanol, isopropyl alcohol or acetone, or a compressed gas such as air or an $N_2$ gas to a laser spot.

EXAMPLES

Next, glass substrates were cut with the above-described glass cutting method, as showing in Examples 1 to 10 and Comparative Examples 1 to 5 below, the significant effects of dimensional accuracy was confirmed according to the present invention.

In the following examples and comparative examples, the glass plate 10 made of soda glass with a thickness of 0.7 mm was prepared. The radiation of a carbon dioxide gas laser with a laser power of 50 W and forced cooling by means of spray of ethanol from a nozzle were performed to the glass plate 10 to make a glass substrate for a touch panel, having size of 87.65 mm by 64.65 mm, as the target size.

The scanning radiation of the carbon dioxide laser was implemented at a laser scanning speed of 4.8 m/minute in the first cutting direction indicated with the broken lines $x_1$ to $x_5$ in FIG. 2A and at a laser scanning speed of 5.2 m/minute in the second cutting direction indicated with the broken lines $y_1$ to $y_5$, thereby obtaining glass substrates of Examples 1 to 5, respectively, by cutting.

Horizontal dimensions at the upper and lower ends of each of the glass substrates in Examples 1 to 5 are denoted by horizontal dimensions 1 and 2, respectively. Longitudinal dimensions at the left and right ends are denoted by longitudinal dimensions 1 and 2, respectively. The horizontal dimensions 1 and 2 and the longitudinal dimensions 1 and 2 are shown in Table 1 below, where these dimensions are all indicated in mm.

TABLE 1

|  | Horizontal dimension 1 | Horizontal dimension 2 | Longitudinal dimension 1 | Longitudinal dimension 2 |
|---|---|---|---|---|
| Example 1 | 87.65 | 87.65 | 64.65 | 64.65 |
| Example 2 | 87.65 | 87.70 | 64.65 | 64.65 |
| Example 3 | 87.70 | 87.80 | 64.65 | 64.65 |
| Example 4 | 87.70 | 87.65 | 64.65 | 64.65 |
| Example 5 | 87.80 | 87.70 | 64.65 | 64.65 |
| Maximum value | 87.80 | 87.80 | 64.65 | 64.65 |
| Minimum value | 87.65 | 87.65 | 64.65 | 64.65 |
| Maximum error (+) | 0.15 | 0.15 | 0.00 | 0.00 |
| Maximum error (−) | 0.00 | 0.00 | 0.00 | 0.00 |
| Error span | 0.15 | 0.15 | 0.00 | 0.00 |

As Comparative Examples 1 to 5, glass substrates having the same target size as that of the glass substrates of Examples 1 to 5 described above were obtained by cutting a glass plate made of the same material with the same structure, but at a fixed laser scanning speed of 4.8 m/minute. The results are shown in Table 2 below.

TABLE 2

|  | Horizontal dimension 1 | Horizontal dimension 2 | Longitudinal dimension 1 | Longitudinal dimension 2 |
|---|---|---|---|---|
| Comparative Example 1 | 87.75 | 87.65 | 64.70 | 64.70 |
| Comparative Example 2 | 87.69 | 87.77 | 64.66 | 64.34 |
| Comparative Example 3 | 87.71 | 87.77 | 64.63 | 64.64 |
| Comparative Example 4 | 87.70 | 87.95 | 64.70 | 64.70 |
| Comparative Example 5 | 87.72 | 87.73 | 64.66 | 64.64 |
| Maximum value | 87.75 | 87.95 | 64.70 | 64.70 |
| Minimum value | 87.69 | 87.65 | 64.63 | 64.34 |
| Maximum error (+) | 0.10 | 0.30 | 0.05 | 0.05 |
| Maximum error (−) | 0.00 | 0.00 | −0.02 | −0.31 |
| Error span | 0.10 | 0.00 | 0.07 | 0.36 |

As can be seen from these results, in Examples 1 to 5 obtained by the glass cutting method according to the present invention, that is, the method at different scanning speeds of laser light in the first and the second cutting directions, the glass substrates can be formed to have a dimensional shape after cutting with the maximum plus error of 0.15 mm and the minus error of 0.00 mm with respect to the target size.

On the other hand, in Comparative Examples 1 to 5 obtained by the method at the same scanning speed of laser light, a variation in dimensional shape occurs, that is, the maximum plus error of 0.3 mm and the maximum minus error of −0.31 mm. Moreover, in Comparative Examples 1 to 5, the occurrence of a burr was visually confirmed on each cut side face.

When the first and the second side cut faces were formed after the above-described scanning speed of laser light was changed from 4.8 m/minute to 4.9 m/minute, which corresponds to the amount of change of less than 4%, significant results could not be obtained. Only the dimensional accuracy with an error span of about 0.3 mm could be obtained as in Comparative Examples 1 to 5. Moreover, the occurrence of a burr was visually confirmed on the cut side face. On the other hand, when the scanning speed was changed by 4% or more, for example, the scanning speed was changed to 5.0 m/minute, the same error span as that in the examples shown in Table 1 could be obtained. Moreover, no burr was observed on the cut face.

The examination was also carried out for the case where a laser power of laser light was varied. When the glass substrate made of the same material with the same structure as those of the glass substrates of Examples 1 to 5 described above was formed by cutting at a laser power of 50 W in the first cutting direction and a laser power of 48 W in the second cutting direction, the glass substrate could be separated at dimensional accuracy with an error span of about 0.15 mm as in each of the examples described above.

Furthermore, also in this case, glass was cut with laser radiation in the first and the second cutting directions with the amount of change in laser power of less than 4%, followed by forced cooling. As a result, as in each of the comparative examples described above, an error span was about 0.3 mm or more. Moreover, the occurrence of a burr was visually confirmed.

Thus, in the present invention, as a specific method for providing laser marks having different depths, laser light is radiated with a difference of 4% or more in scanning speed as well as in laser power.

Based on the following results of measurements, it was found that a depth of a laser mark of 0.06 mm or more was required as a depth of a laser mark.

In the following example, glass plates made of soda glass respectively with thicknesses of 0.7 mm and 0.55 mm were prepared. Laser marks were made to have different depths in the first and the second cutting directions described above. Then, the shallow depth of the laser mark and a static load strength to a glass substrate after each cutting were measured. The static load strength was measured by a normal glass breaking strength measurement device with a presser having a diameter of 20 mm and at a pressurizing rate of 1 mm/second. The results were shown in Table 3 below.

TABLE 3

|  | Glass strength against crack [kgf] | |
|---|---|---|
| Depth of laser mark [mm] | Glass with thickness of 0.7 mm | Glass with thickness of 0.55 mm |
| 0.04 | 28 | 20 |
| 0.06 | 49 | 32 |
| 0.08 | 54 | 35 |
| 0.10 | 60 | 37 |
| 0.12 | 60 | 37 |
| 0.13 | 60 | 37 |

As can be seen from the results, in the case where the depth of a laser mark was less than 0.06 mm, i.e., 0.04 mm, the static load strength is remarkably deteriorated, that is, as low as 28 kgf or less. On the other hand, in the case where the depth of a laser mark was 0.06 mm, the static load strength was improved even by 21 kgf for glass having a thickness of 0.7 mm and by 12 kgf for glass having a thickness of 0.55 mm, as compared with the case where the depth of a laser mark was 0.04 mm.

Therefore, for the glass substrates according to the present invention, the depth of a laser mark is selected to be 0.06 mm or larger.

Next, the results of measurements in the case where the glass plate was cut in the first and the second cutting directions by radiating laser light from its first and second principal surfaces are shown.

In Examples 6 to 10, the glass plate was cut load light radiation from the first and the second principal surfaces at a laser power of 50 W and a laser scanning speed of 4.8 m/minute, followed by forced cooling. The dimensional accuracy of each of the glass substrates obtained by cutting was measured in the same manner as in Examples 1 to 5 and Comparative Examples 1 to 5 described above. In Table 4, all dimensional values are indicated in mm.

TABLE 4

|  | Horizontal dimension 1 | Horizontal dimension 2 | Longitudinal dimension 1 | Longitudinal dimension 2 |
|---|---|---|---|---|
| Example 6 | 87.70 | 87.65 | 64.65 | 64.65 |
| Example 7 | 87.65 | 87.65 | 64.65 | 64.65 |
| Example 8 | 87.65 | 87.70 | 64.65 | 64.65 |
| Example 9 | 87.65 | 87.65 | 64.65 | 64.65 |
| Example 10 | 87.65 | 87.70 | 64.65 | 64.65 |
| Maximum value | 87.70 | 87.70 | 64.65 | 64.65 |
| Minimum value | 87.65 | 87.65 | 64.65 | 64.65 |
| Maximum error (+) | 0.05 | 0.05 | 0.00 | 0.00 |
| Maximum error (−) | 0.00 | 0.00 | 0.00 | 0.00 |
| Error span | 0.05 | 0.05 | 0.00 | 0.00 |

As can be seen from the results, in the case where laser light is radiated from the first and the second principal surfaces, dimensional errors are 0.05 mm for a plus error and 0.00 mm for a minus error. Therefore, it is found that an error span is restrained to 0.05 mm or less.

Moreover, a surface roughness of the cut side face in each of Examples 1 to 10 described above was measured through an atomic force microscope (AFM). Then, it was found that a surface roughness could be restrained to 50 nm or less in all Examples.

Figure 4:
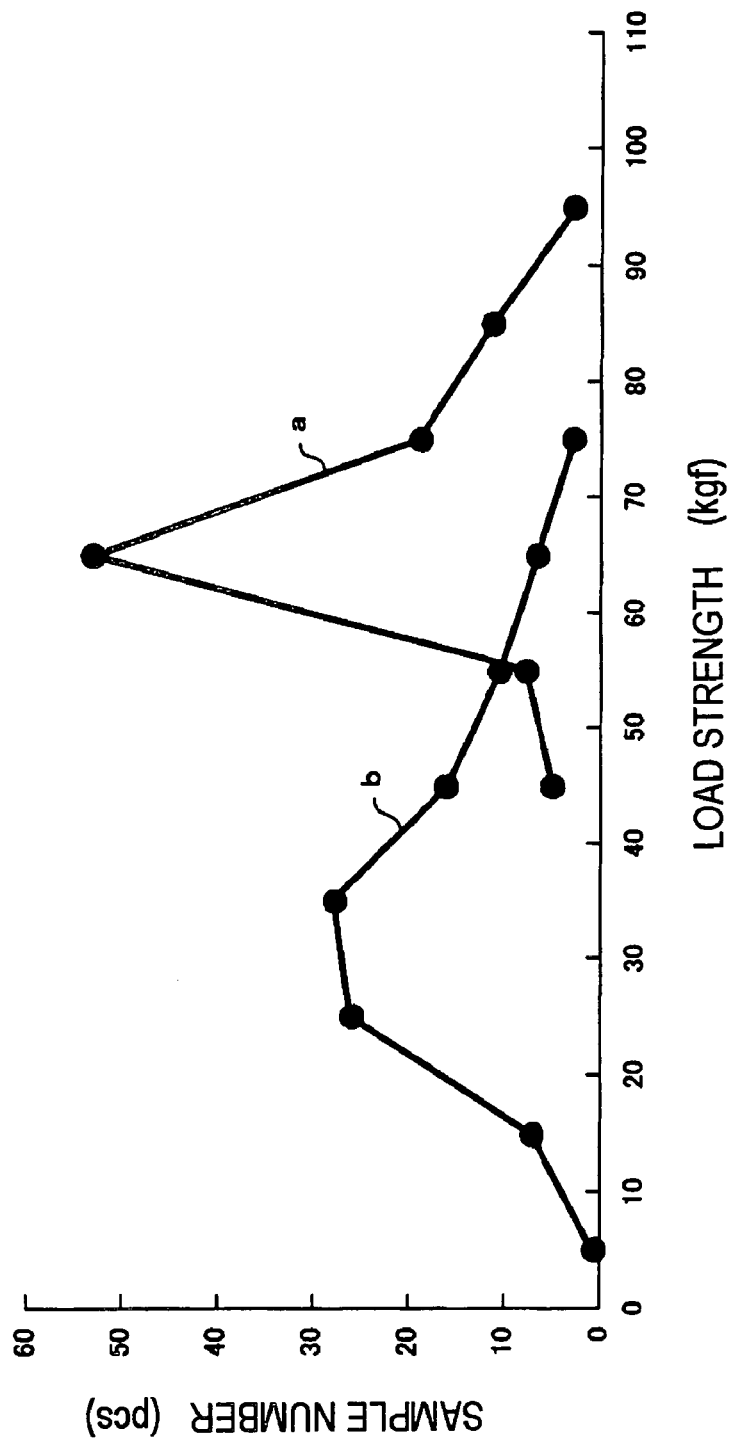
FIG. 4 is a distribution map showing a relationship between sample numbers and the load strength of glass substrates.

Moreover, FIG. 4 shows the results of measurements for a static load strength of a glass substrate obtained by cutting according to the present invention including Examples described above and a static load strength of a glass substrate obtained by cutting with a carbide roller. In this case, the static load strength was also measured with a normal glass breaking strength measurement device. A diameter of a presser was 20 mm, and a pressurizing rate was set at 1 mm/second. In FIG. 4, a solid line a represents the glass substrate according to the present invention, while a solid line b represents the glass substrate having a conventional structure obtained by cutting with the carbide roller. The peak number of samples was obtained at a static load strength of about 65 kgf according to the present invention. On the other hand, a strength of only about 30 kgf was obtained for glass substrates of a conventional structure.

Based on this result, it is understood that the glass substrates obtained by the glass cutting method according to the present invention have a static load strength of about 45 kgf or more.

Figure 5A:
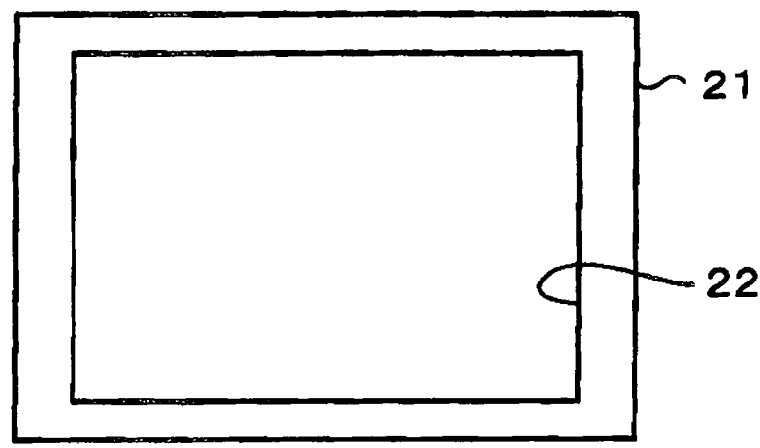
FIG. 5A is a schematic plan view of a frame of a touch panel.
Figure 5B:
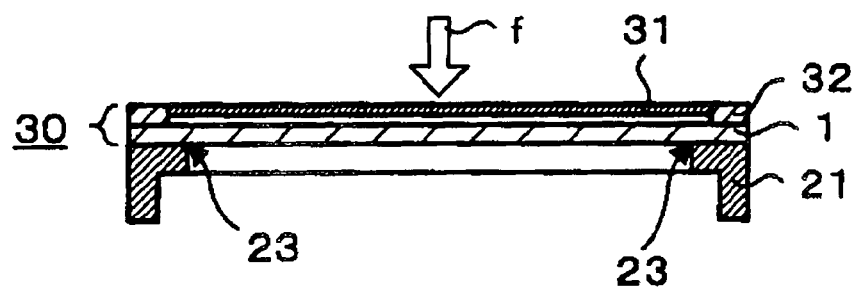
FIG. 5B is a schematic sectional view of a frame of a touch panel.

The example where such a glass substrate excellent in strength properties as compared with a conventional glass substrate is used for a touch panel is schematically shown in FIGS. 5A and 5B. In FIG. 5A, a frame 21 for mounting and fixing a glass substrate used for a touch panel thereon is shown. The frame 21, which is made of an Al alloy or the like, is fixedly placed on each of various displays such as a liquid crystal display device or an organic EL (Electro Luminescence) display device. A window section 22 is formed at the position corresponding to a display screen.

FIG. 5B shows a schematic sectional structure in the state where a touch panel 30 is fixedly mounted onto the frame 21. The touch panel 30 is constituted as follows. On the glass substrate 1, a light-transmitting conductive layer made of ITO (a complex oxide of In—Sn) is formed to have a predetermined pattern through sputtering or the like, although not shown in the drawings. On this light-transmitting conductive layer, a film base material 31, on which another light-transmitting conductive layer made of ITO or the like is formed to have a predetermined pattern, is provided through spacers made of an acrylic resin or the like. The film base material 31 and the glass substrate 1 are arranged so as to be opposed to each other with a predetermined distance therebetween so that the light-emitting conductive layers are situated on the inner sides. Then, the film base material 31 and the glass substrate 1 are supported and fixed at a distance of about several μm therebetween, for example, through an adhesive tape, for example, at an outer edge 32.

Figure 6A:
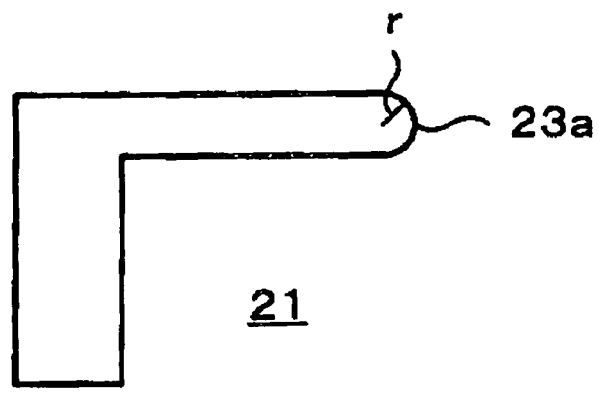
FIG. 6A is an illustration of an inner end edge of a window portion of a frame of a touch panel.
Figure 6B:
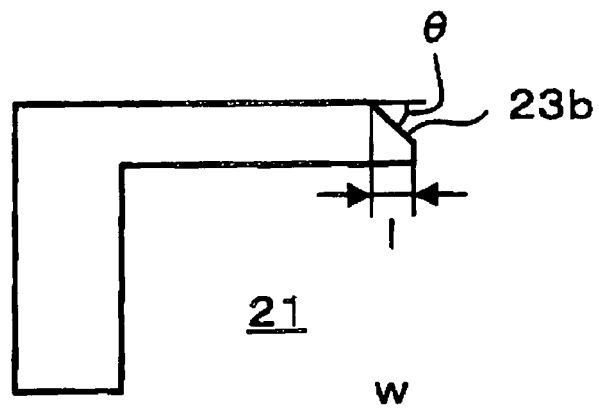
FIG. 6B is an illustration of an inner end edge of a window portion of a frame of a touch panel.
Figure 6C:
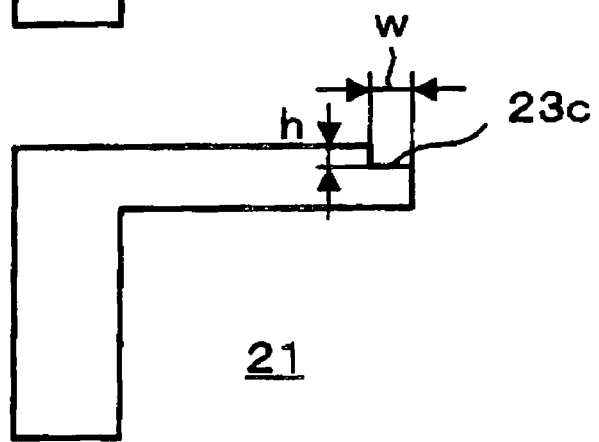
FIG. 6C is an illustration of an inner end edge of a window portion of a frame of a touch panel.

In the present invention, along with the improvement in strength of the glass substrate 1, in particular, an inner end edge 23 of the window section of the frame 21 is constituted to have a shape obtained through various processes as schematically shown in FIGS. 6A to 6C. For example, as shown in FIG. 6A, a peripheral surface 23a, that is, an R-surface having a radius r of 0.2 mm or more and 0.5 mm or less is provided.

Alternatively, as shown in FIG. 6B, a slope 23b is provided to have a length 1 of 0.2 mm or more and 0.5 mm or less from the inner end edge and at an angle θ of 10° and or more and 45° or less from a plane parallel to the glass substrate.

Further alternatively, as shown in FIG. 6C, a step 23c is provided to have a width w of 0.2 mm or more and 0.5 mm or less from the inner end edge and a step height h of 0.2 mm or more and 0.5 mm or less from a plane opposed to the glass substrate.

By processing the inner end edge 23 of the window section in this manner, the load strength of the glass base material, which is fixedly attached onto the frame 21 through a tape, a paste or the like, can be increased.

In the case where a peripheral surface is formed on the inner end edge 23 of the window section of the frame 21 described above, a yield is remarkably decreased with the radius r of less than 0.2 mm. Although the radius r exceeding 0.5 mm is effective against glass breakage, the workability is disadvantageously decreased in a fabrication process. Therefore, in the case where a peripheral surface is formed, it is desirable that the radius r is should be set within the range of 0.2 mm to 0.5 mm.

In the case where a slope is formed on the inner end edge 23 of the window section of the frame 21, no change is observed in yield with the length 1 of 0.2 mm at the angle θ of 45° or more. Since a stable strength is obtained with the length 1 in the range of 0.2 mm to 0.5 mm at the angle θ in the range of 10° to 45°, it is desired that the length l and the angle θ should be selected within the above ranges when a slope is formed.

Moreover, also in the case where the step is provided, significant effects in terms of glass strength can be obtained when the step width w is selected to be within the range of 0.2 mm to 0.5 mm and the step height h is selected to be within the range of 0.2 mm to 0.5 mm. Therefore, it is desirable that the step should be formed so that its width and height fall within the above ranges.

As described above, a peripheral surface, a slope or a step is formed on the inner end edge of the window section of the frame at the display, on which a touch panel is fixedly placed, thereby further increasing the load strength of glass. As a result, the strength of a product can be improved.

As a material of the glass substrate, soda glass or the like can be used as described above. In the case where a glass substrate manufactured by a float method is used, the glass substrate can further hold the strength by the following method.

Figure 7A:
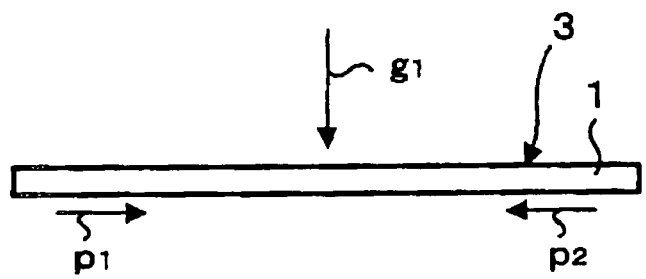
FIG. 7A is an illustration of a strength of a glass substrate.

A float method is a method of manufacturing glass. According to this method, a glass material is molten in tabular and is then allowed to flow on molten Sn so as to generate a compression stress on a surface which is not in contact with molten Sn, thereby improving the flatness of this surface. In a glass substrate manufactured by the float method, as schematically illustrated in FIG. 7A, compression stresses $p_1$ and $p_2$ are generated on the surface opposed to a float surface 3 side (the surface being in contact with molten Sn). When a load is applied from the float surface 3 side as indicated with an arrow $g_1$, a tension is generated in the direction offsetting the compression stresses $p_1$ and $p_2$.

Figure 7B:
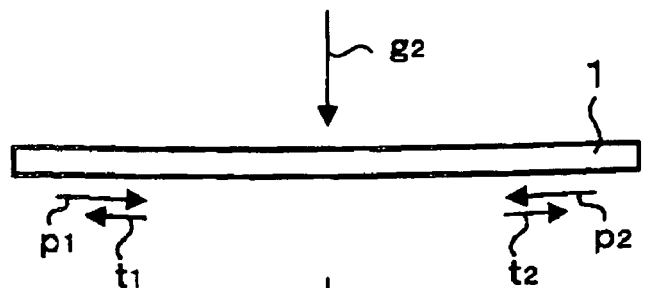
FIG. 7B is an illustration of a strength of a glass substrate.
Figure 7C:
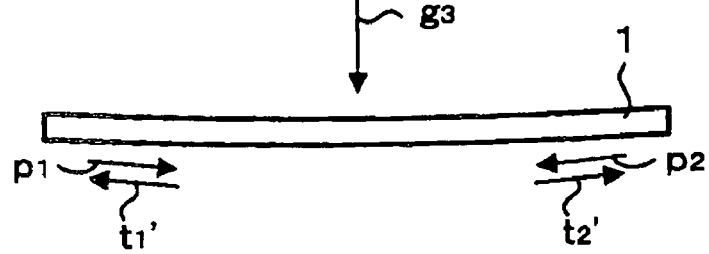
FIG. 7C is an illustration of a strength of a glass substrate.
Figure 7D:
FIG. 7D is an illustration of a strength of a glass substrate.
Figure 8:
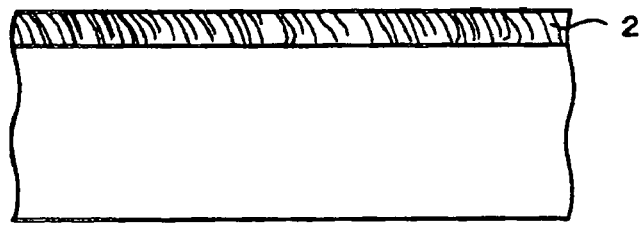
FIG. 8 is a schematic sectional view of an example of a conventional glass substrate.
Figure 9A:
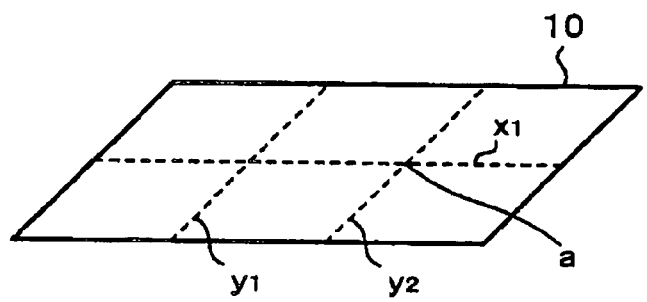
FIG. 9A is an illustration of a glass cutting method.
Figure 9B:
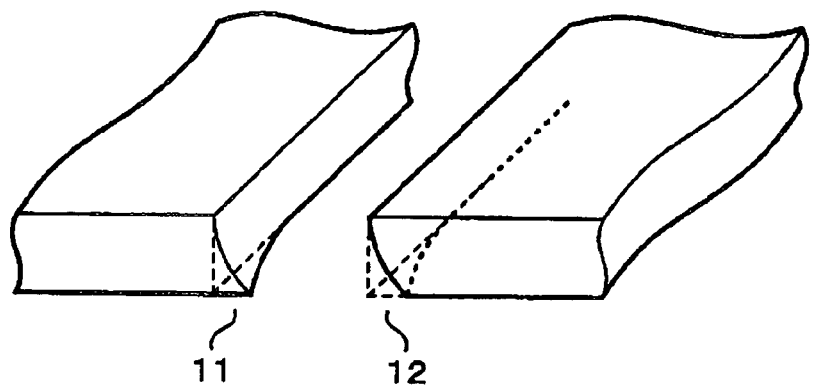
FIG. 9B is an illustration of cut side faces of glass.
Figure 9C:
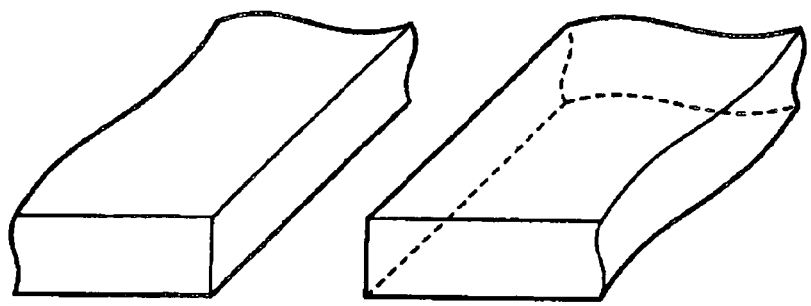
FIG. 9C is an illustration of cut side faces of glass.

In the case where an applied load $g_2$ is small as shown in FIG. 7B, tensions $t_1$ and $t_2$ are offset by the compression stresses $p_1$ and $p_2$. When an applied load $g_3$ is increased as shown in FIG. 7C, tensions $t_1'$ and $t_2'$ become equal to the compression stresses $p_1$ and $p_2$. The glass substrate 1 normally maintains the load strength up to this state. If the applied load is further increased, the glass substrate 1 is broken as shown in FIG. 7D.

As described above, since the glass substrate manufactured by the float method has compression stresses on its front surface, such a glass substrate has a high load strength against the pressure from its back surface as compared with other glass substrates.

However, in the case where the glass substrate 1 is used as a glass substrate for a touch panel, the glass substrate is heated at a high temperature of 300° C. or higher when a light-transmitting conductive layer, an $SiO_2$ coating film or the like is grown by sputtering, vapor deposition, dipping or the like.

At this high-temperature heating, due to annealing effects in which a compression stress inherent to the glass substrate manufactured by the float method is released by heat, the glass substrate can no longer hold its original load strength. Specifically, the strength owing to compression stresses described above in FIGS. 7A to 7C disappears. As a result, the load strength resulting from the float surface 3 is deteriorated.

The inventors and the like succeeded in reduction of release of stresses due to heat by using a low-temperature film growth method at 200° C. or lower when a conductive layer made of ITO or the like is to be grown by sputtering or vapor deposition described above. As a result, a significant difference could be obtained in load strength after film growth.

The following Table 5 shows the number of samples of glass substrates after film growth through conventional sputtering, the number of samples of glass substrates after film growth through low-temperature sputtering, average load strengths (N), their standard deviations, the minimum values and the maximum values.

TABLE 5

|  | Before film growth | Glass substrate formed by normal sputtering | Glass substrate formed by low-temperature sputtering |
|---|---|---|---|
| Sample number | 100 | 100 | 100 |
| Average load strength [N] | 16.42 | 7.57 | 14.60 |
| Standard deviation | 3.044 | 1.804 | 3.044 |
| Minimum value | 9.40 | 5.31 | 7.47 |
| Maximum value | 20.11 | 13.37 | 18.80 |
| Amount of degradation under load [N] | — | 8.81 | 1.81 |

As can be seen from Table 5, for a glass substrate after conventional film growth, the load strength is deteriorated by about 9 N in terms of the mean value. On the other hand, the deterioration in load strength is stayed about 2 N in the case of the glass substrate obtained through low-temperature sputtering at 200° C. or lower.

Therefore, a light-transmitting conductive layer made of ITO or the like is formed on the glass substrate by low-temperature sputtering at 200° C. or lower, so that the original strength of the glass substrate that is manufactured by the float method can be maintained. Furthermore, the strength of a product can be maintained. As a result, it is understood that the reliability of a product can be improved.

As described above, according to the present invention, in a glass cutting method, glass is cut while varying a laser power of laser light or a scanning speed of laser light between a first cutting direction and a second cutting direction so that laser marks have different depths on cut side faces of a glass substrate after cutting. As a result, a slant face or a curved face can be prevented from being generated on the cut side face. Therefore, the glass substrate can be formed with vertical side faces.

Each of the above described examples has been described for the case where the glass substrate is used for a touch panel or a touch panel of a portable terminal. However, it is apparent that various changes and modifications are possible for the present invention unless the present invention departs from the above-described structure of the present invention. For example, the present invention is applicable to a glass substrate which is used for various displays such as PDA (Personal Digital Assistant), POS (Point Of Sales) or ATM (Automatic Teller Machine).

What is claimed is:

1. A glass substrate for a touch panel, the glass substrate formed by cutting at least with laser light radiation, comprising:
   said glass substrate having a first principal surface and a cut side face substantially perpendicular to said first principal surface, said cut side face at least partially formed by a cutting method including at least cutting with laser light radiation, wherein a surface roughness of the cut side face of said glass substrate is 50 nm or less, and a depth of a first laser mark formed by said laser light radiation on said cut side face is 0.06 mm or more; and
   the glass substrate includes at least one second side surface at said outermost peripheral edge of said first principal surface, the at least one second side surface is substantially perpendicular to said first principal surface and includes a second laser mark formed thereon, the second laser mark extends from said peripheral edge of said first principal surface along said at least one second side surface for a depth of 0.06 mm or more, wherein said glass substrate has a strength of 55 kgf or more and 90 kgf or less based on a static load test, and said depth of said first laser mark is different from said depth of said second laser mark.

2. The glass substrate according to claim 1, wherein said glass substrate has no crack and pulverized powder at said at least one first side surface.

3. The glass substrate according to claim 1, wherein said at least one second side surface is substantially perpendicular to said at least one first side surface.

4. The glass substrate according to claim 1, wherein the difference in depths between said first laser mark and said second laser mark is 2% or more.

5. The glass substrate according to claim 1, further comprising:

a second principal surface, wherein the at least one second side surface being provided at an outermost peripheral edge of said second principal surface, said second principal surface being opposite to said first principal surface; and wherein the second laser mark extends from said peripheral edge of said second principal surface along said at least one second side surface for a depth of 0.06 mm or more.

6. The glass substrate according to claim 1, wherein said glass substrate has a thickness equal to or greater than 0.25 mm and less than or equal to 0.7 mm.

7. The glass substrate according to claim 1, wherein said glass substrate is a planar glass plate.

* * * * *